US005471837A

United States Patent [19]

Bianchetta

[11] Patent Number: 5,471,837

[45] Date of Patent: Dec. 5, 1995

[54] HYDRAULIC SYSTEM USING MULTIPLE SUBSTANTIALLY IDENTICAL VALVE ASSEMBLIES

[75] Inventor: Donald L. Bianchetta, Coal City, Ill.

[73] Assignee: Caterpillar Inc., Peoria, Ill.

[21] Appl. No.: 115,621

[22] Filed: Sep. 3, 1993

[51] Int. Cl.$^6$ .................................................... F16D 39/00

[52] U.S. Cl. ................................ 60/426; 60/452; 60/486; 91/517; 91/518

[58] Field of Search .............................. 60/426, 427, 428, 60/452, 486; 91/512, 517, 518

[56] References Cited

U.S. PATENT DOCUMENTS

| | | | |
|---|---|---|---|
| 3,847,059 | 11/1974 | Beck et al. | 91/413 |
| 4,531,366 | 7/1985 | Moriya et al. | 60/428 |
| 4,561,341 | 12/1985 | Aikawa | 60/486 |
| 5,063,739 | 11/1991 | Bianchetta et al. | 60/421 |
| 5,138,837 | 8/1992 | Obertrifter et al. | 91/446 |

FOREIGN PATENT DOCUMENTS

| | | | |
|---|---|---|---|
| 57902 | 4/1982 | Japan | 60/452 |

*Primary Examiner*—F. Daniel Lopez
*Attorney, Agent, or Firm*—John W. Grant

[57] ABSTRACT

A hydraulic control system is designed to permit the use of a plurality of small substantially identical existing valve assemblies in place of a lesser number of larger valve assemblies. In one embodiment, a first pair of variable displacement load sensing hydraulic pumps communicate with a manifold connected to a first valve assembly and another pair of variable displacement load sensing hydraulic pump communicate with a second manifold connected to second and third valve assemblies. A crossover conduit interconnects the manifolds so that fluid from all four pumps can be used by any one of the valve assemblies or shared by two or all three of the valve assemblies. In another embodiment, a third pair of variable displacement load sensing hydraulic pumps communicate with the first manifold 12 which also has another valve assembly connected thereto. Also in this embodiment, two crossover conduits interconnect the manifolds so that the fluid from all six pumps can be used by any one of the valve assemblies or shared by two or more of the valve assemblies.

5 Claims, 3 Drawing Sheets

HYDRAULIC SYSTEM USING MULTIPLE SUBSTANTIALLY IDENTICAL VALVE ASSEMBLIES

TECHNICAL FIELD

This invention relates to a hydraulic system and more particularly to a hydraulic system using multiple substantially identical valve assemblies connected to multiple pumps.

BACKGROUND ART

The current trend for many mining operations is the use of large hydraulically operated front loading shovels for loading large off road trucks. One of the problems encountered with designing and manufacturing such shovels is the availability of hydraulic components sized to handle the required hydraulic flow. For example, the hydraulic systems for smaller front loading shovels and similarly sized hydraulic excavators typically have a pair of three spool valve assemblies connected to a center manifold to provide a parallel flow arrangement to the hydraulic motors. However, the physical size of the valve bodies of the valve assemblies needed for larger front loading shovels is such that specialized manufacturing equipment, i.e., both foundry equipment for casting the body and precision machining tooling for machining the castings would have to be acquired to make the valves. Since the demand for such large shovels is not expected to match, for example, the demand for smaller vehicles, the cost of the specialized equipment would have to be amortized over a smaller number of vehicles thereby making the cost of the hydraulic system way out of line with the cost of the total vehicle.

Another example would be the availability and/or cost of the hydraulic pumps if a single hydraulic pump were used for providing total flow for the hydraulic system. Typically, a variable displacement hydraulic pump having a displacement of 1000 lpm would cost more than twice that of a hydraulic pump having a displacement of 500 lpm.

Accordingly, in view of the above, it would be desirable to be able to use multiples of existing smaller valve assemblies in such a way to provide a hydraulic system for a large vehicle having the desired fluid flow handling capability. Using multiples of existing smaller valve assemblies will reduce the overall vehicle cost in several ways. For example, a single large valve costs more than two smaller valves having a combined flow capacity of the larger valve. Moreover, using existing valves minimizes the development cost that would be required to design, build and test a new larger valve.

The present invention is directed to overcoming one or more of the problems as set forth above.

DISCLOSURE OF THE INVENTION

In one aspect of the present invention, a hydraulic system includes at least three valve assemblies with each valve assembly including a plurality of directional control valves, a common supply passage to provide parallel flow to the directional control valves, a plurality of pressure compensated flow control valves individually associated with the directional control valves, and a load pressure resolver network disposed to resolve out the highest load pressure of the valve assembly. A first manifold is connected to the first valve assembly and has an inlet port, a crossover port, and a manifold passage communicating with the inlet port, the crossover port, and the supply passage of the first valve assembly. A second manifold interconnects the second and third valve assemblies and has an inlet port, a crossover port and a manifold passage communicating with the inlet port, the crossover port and both supply passages of the second and third valve assemblies. A first conduit communicates at least one of a plurality of load sensing variable displacement pumps to the inlet port of one of the manifolds. A second conduit communicates at least two of the pumps to the inlet port of the other manifold. A third conduit is connected to the crossover ports of both manifolds. A means is provided for resolving out the highest load pressure of all the valve assemblies and delivering a control signal corresponding to the highest load pressure to all of the flow control valves of all valve assemblies and to the pump displacement controls of all the hydraulic pumps.

BEST MODE FOR CARRYING OUT THE INVENTION

Figure 1:
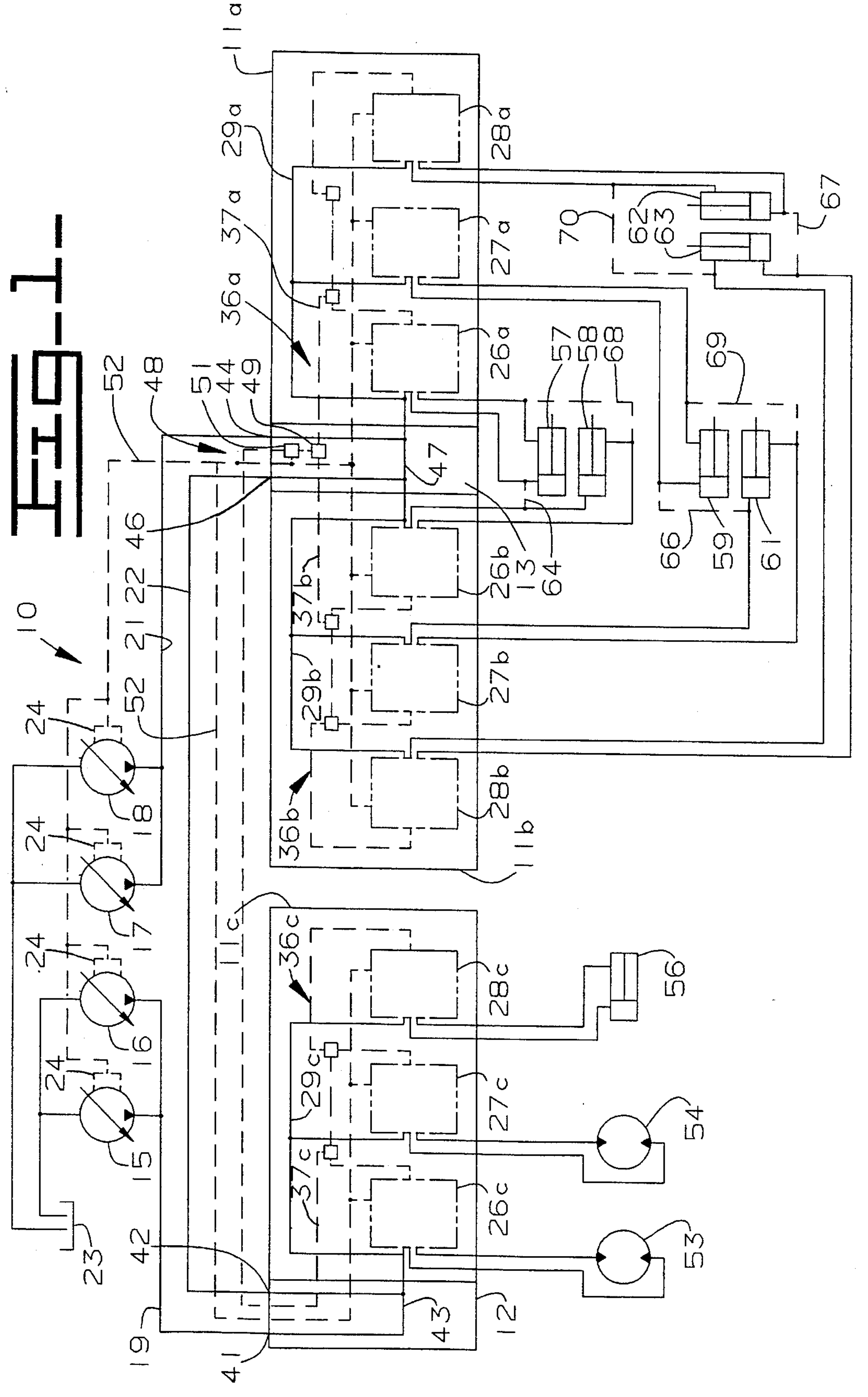
FIG. 1 is a schematic illustration of one embodiment of the present invention.
Figure 2:
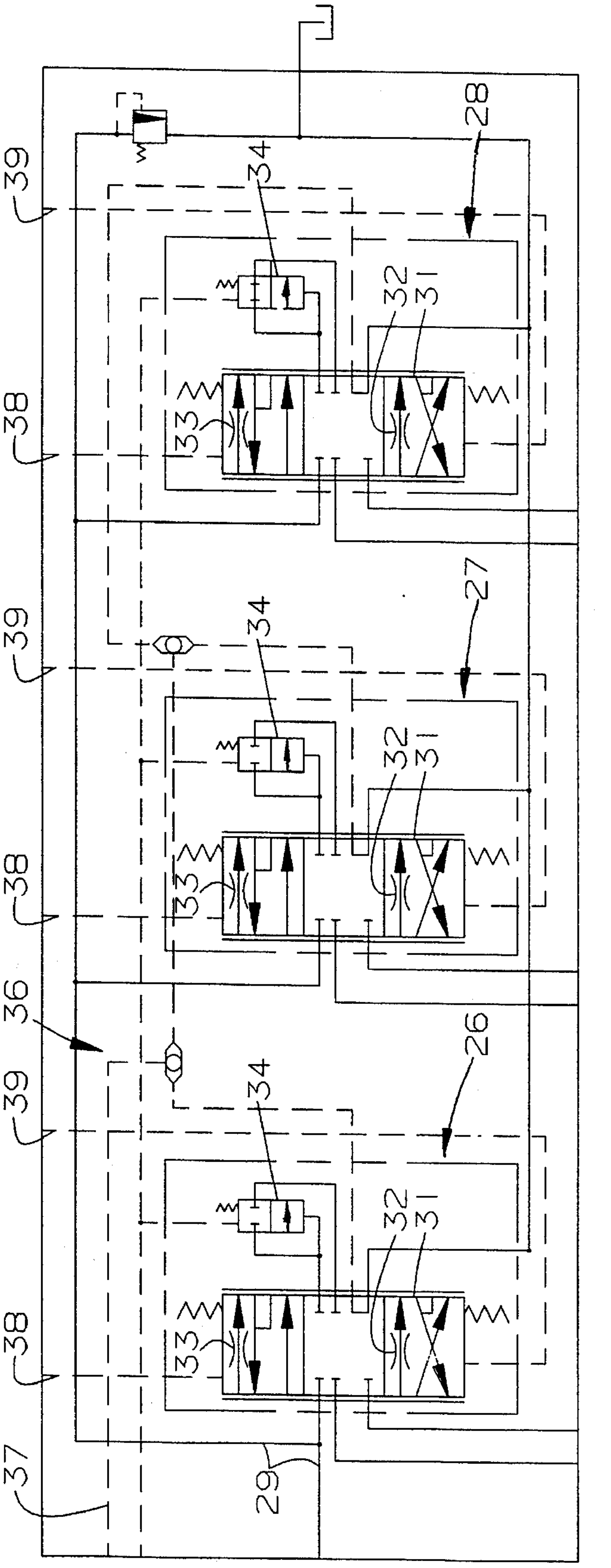
FIG. 2 is a schematic illustration of one of the valve assemblies of the present invention.

Referring to FIGS. 1 and 2, a hydraulic control system 10 includes a plurality of valve assemblies such as the three shown at 11*a*, 11*b* and 11*c*, a manifold 12 connected to the valve assembly 11*a*, another manifold 13 disposed between and connected to the valve assemblies 11*a* and 11*b*, a plurality of variable displacement load sensing pumps such as the four shown at 15,16,17,18; a supply conduit 19 communicating the pumps 15,16 with the manifold 12, another supply conduit 21 communicating the pumps 17,18 to the manifold 13, a crossover conduit 22 intercommunicating the manifolds 12,13, and a tank 23. Each of the pumps 15,16,17,18 has a load sensing displacement controller 24.

The valve assemblies 11*a*,11*b*,11*c* are substantially identical with FIG. 2 being representative thereof. The valve assembly of FIG. 2 will hereinafter be described using base numbers with the base numbers followed by the appropriate letter a, b, or c used for the same components of FIG. 1. As specifically illustrated in FIG. 2, each of the valve assemblies include three proportional priority pressure compensated control valves 26,27,28 connected in parallel to a common supply passage 29. Each of the control valves 26,27,28 includes a pilot operated directional control valve 31 having a pair of variable metering orifices 32,33 and a pressure compensating flow control valve 34 disposed downstream of the metering orifices in a series flow relationship when the directional control valves are shifted to an operating position. Each valve assembly also includes a load pressure resolver network 36 for sensing the load pressures in the control valves 26,27,28 and delivering a control signal corresponding to the highest load pressure of the valve assemblies to an output passage 37. Each of the directional control valves has a pair of pilot passages 38,39 connected to the ends thereof.

The manifold 12 has an inlet port 41 connected to the conduit 19, a crossover port 42 connected to the conduit 22 and a manifold passage 43 communicating with the inlet port 41, the crossover port 42 and the supply passage 29 of the valve assembly 11*c*. The manifold 13 has an inlet port 44 connected to the supply conduit 21, a crossover port 46 connected to the conduit 22, and a manifold passage 47 connected to the inlet port 44, the crossover port 46, and the supply passages **29*a* and 29*b* of the valve assemblies 11*a* and 11*b***. This arrangement of manifolds and conduits puts all of the control valves in a parallel flow relationship.

A means 48 is provided for resolving out the highest load pressure of all the valve assemblies and delivering a control signal corresponding to the highest load pressure to all of the flow control valves 34 of all valve assemblies and to the pressure displacement controllers 24 of the hydraulic pumps. The means includes, for example, a resolver 49 connected between the output passages **37*a* and 37*b* of the valve assemblies 11*a* and 11*b*, another resolver 51 connected between the resolver 49 and the output passage 37*c* of the valve assembly 11*c* and to a common signal delivery line 52 connected to all flow control valves of the valve assemblies and to the pump displacement controllers 24** of all the pumps.

The control valves **26*c* and 27*c* are connected to a pair of rotary drive motors 53,54 respectively and the control valve 28*c* is connected to a double-acting hydraulic actuator 56. The control valves 26*a* and 26*b* are each connected to one of a pair of hydraulic actuators 57,58 that are structurally tied together so that they act in unison. The control valves 27*a* and 27*b* are similarly connected to a pair of actuators 59,61. Finally, the control valves 28*a* and 28*b* are each connected to one of a pair of hydraulic actuators 62,63. The head ends of each pair of hydraulic actuators 57,58; 59,61, and 62,63 are interconnected by an equalizing line 64,66,67 respectively. Likewise, the rod ends of each pair of actuators are interconnected by an equalizing line 68,69,70**.

While the embodiment of FIG. 1 discloses four pumps, any one of the pumps 15–18 can be omitted if the flow requirements of the system can be satisfied by only three pumps.

Figure 3:
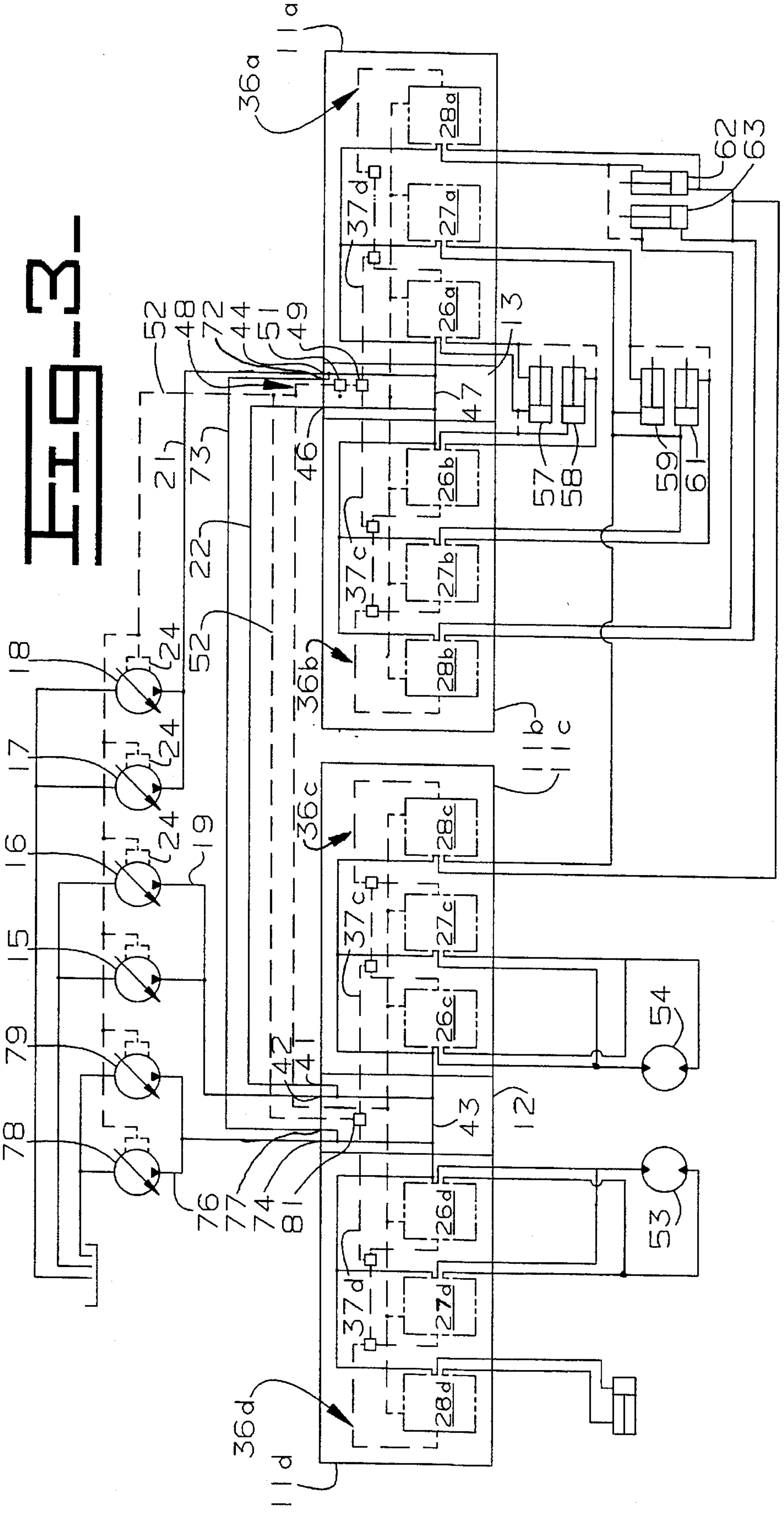
FIG. 3 is a schematic illustration of another embodiment of the present invention.

An alternate embodiment of a hydraulic system 10 of the present invention is disclosed in FIG. 3. It is noted that the same reference numerals of the first embodiment are used to designate similarly constructed counterpart elements of this embodiment. In this embodiment, however, the manifold 13 includes an additional crossover port 72 communicating with the manifold passage 47 and connected to another crossover conduit 73. The manifold 12 is disposed between a pair of valve assemblies **11*c* and 11*d* and includes an additional inlet prot 74 communicating with the manifold passage 43 and connected to a supply conduit 76 and an additional crossover port 77 connected to the crossover conduit 73. The supply conduit 76 is connected to another pair of variable displacement load sensing hydraulic pumps 78,79**.

The resolving means 48 includes an additional resolver 81 connected between the output passages **37*c* and 37*d* and to the resolver 51**.

Also in this embodiment, the control valves **26*d* and 27*d* are connected to the same drive motor 53, the control valves 26*c* and 27*c* are connected to the same drive motor 54, and the control valve 28*d* functions as a cross-over valve to supplement fluid flow to either the head end of the hydraulic cylinders 62,63 or the head ends of hydraulic cylinders 59,61**.

INDUSTRIAL APPLICABILITY

In the use of the FIG. 1 embodiment, the control valves **26*a* and 26*b*, 27*a* and 27*b*, and 28*a* and 28*b* are actuated in pairs with each pair being simultaneously actuated by a common pilot signal. To extend the actuators 57,58, for example, the pair of control valves 26*a* and 26*b* are actuated to communicate fluid from the supply passages 29*a* and 29*b* to the head ends of the actuators 57,58 respectively. Conversely, to retract the hydraulic actuators 57 and 58, the pair of control valves 26*a* and 26*b* are actuated to communicate fluid from the supply passages to the rod ends of the hydraulic actuators. Actuation of the actuators 59 and 61, and 62 and 63 are similarly controlled by the pairs of control valves 27*a* and 27*b*, and 28*a* and 28*b*. If only a single pair of control valves are actuated, the fluid from the pumps 17 and 18 passes through the supply conduit 21, the manifold 13, the supply passage 29*a* and the control valve 26*a* to the hydraulic actuator 57. Simultaneously, the fluid from the pumps 15,16 passes through the supply conduit 19, the manifold 12, the conduit 22, the manifold 13, the supply passage 29*b* and the control valve 26*b* to the actuator 58. Similarly, if two or more pairs of the control valves are actuated at the same time, the output of all four pumps would be shared by the actuated valves. If one or more pair of the control valves are actuated simultaneously with one or more of the control valves 26*c*,27*c* or 28*c***, the flow of all four pumps is shared by the actuated valves. In the above situations, the highest load pressure of the system is directed to the displacement controllers of all the pumps resulting in the output of all four pumps being substantially equal. Moreover, since the highest load pressure is also directed to all of the flow control valves, the flow is split proportional to the degree of opening of each actuated control valve.

Each of the control valves has the capacity of handling up to two pump flows such that if any two control valves are fully actuated, all four pumps move to their maximum displacement settings. However, since the flow of the pumps 15,16 goes directly to the manifold 12 and the flow from pumps 17,18 goes to the manifold 13, the crossover conduit 22 is never required to handle more than two pump flows so that the crossover conduit 22 need only be sized to handle two pump flows.

In the FIG. 3 embodiment, fluid from the pumps 17 and 18 is communicated directly to the manifold 13 through the conduit 21 while the fluid from the pumps 15 and 16, and 78 and 79 is communicated directly to the manifold 12 through the conduits 19 and 76 respectively. If three or more of the control valves **26*c*,27*c*,28*c*,26*d*,27*d*,or 28*d* are actuated to their fully open position, all six pumps move to their maximum displacement setting. The fluid from the pumps 17 and 18 would pass through the conduits 22 and 73 to the manifold 12 for use by the actuated control valves. Similarly, if two or more pair of the control valves 26*a* and 26*b*; 27*a* and 27*b*; or 28*a* and 28*b* are actuated to their fully open position, the fluid flow from the pumps 78,79,15 and 16 would pass through the conduits 22 and 73 to the manifold 13 for use by the actuated valves. Since this embodiment has two conduits 22 and 73** interconnecting the manifolds, each of those conduits need only be sized to handle two pump flows.

In view of the above, it is readily apparent that the structure of the present invention provides an improved hydraulic system capable of providing the flow handling capability required for large vehicles through the use of existing valve assemblies. By using multiples of existing smaller valve assemblies, the overall cost of the hydraulic system is less than if larger valve assemblies were used. For example, a single large valve assembly costs more than two smaller valve assemblies which have a combined flow capacity equal to the larger valve assembly. Moreover, using existing valve assemblies minimizes the development cost that would be required to design, build and test a new larger valve.

Other aspects, objects and advantages of this invention can be obtained from a study of the drawings, the disclosure and the appended claims.

I claim:

1. A hydraulic control system comprising;

at least three valve assemblies, each valve assembly including a plurality of directional control valves, a common supply passage to provide parallel flow to the directional control valves, a plurality of pressure compensated flow control valves individually associated with the directional control valves, a load pressure resolver network disposed to resolve out the highest load pressure of the valve assembly;

a first manifold connected to a first valve assembly and having an inlet port, a crossover port, and a manifold passage communicating with the inlet port, the crossover port, and the supply passage of the first valve assembly;

a second manifold interconnecting second and third valve assemblies and having an inlet port, a crossover port, and a manifold passage communicating with the inlet port, the crossover port and both supply passages of the second and third valve assemblies;

a plurality of load sensing variable displacement hydraulic pumps each having a pump displacement controller;

a first conduit communicating at least one of the pumps to the inlet port of one of the manifolds;

a second conduit communicating at least two of the pumps to the inlet port of the other manifold;

a third conduit intercommunicating the crossover ports of both manifolds; and means for resolving out a highest load pressure of all the valve assemblies and delivering a control signal corresponding to the highest load pressure to all of the flow control valves of all valve assemblies to the pump displacement controllers of all the hydraulic pumps.

2. The hydraulic control system of claim 1 wherein the third conduit is sized to handle fluid flow from up to but no more than two of the hydraulic pumps.

3. The hydraulic control system of claim 2 including at least four hydraulic pumps with two of the pumps being connected to the first conduit and two of the pumps being connected to the second conduit.

4. The hydraulic control system of claim 1 wherein the second manifold includes another crossover port and the first manifold includes another inlet port and another crossover port, the hydraulic system including another valve assembly connected to the first manifold, another pair of variable displacement load sensing pumps a fourth conduit connected to said another pair of pumps and to the inlet port of the first manifold, and a fifth conduit connected to said another crossover ports of both manifolds.

5. The hydraulic control system of claim 4 wherein the third and fifth conduits are each sized to handle fluid flow from up to but no more than two of the hydraulic pumps.

* * * * *